(12) United States Patent
Wolfe et al.

(10) Patent No.: US 9,239,994 B2
(45) Date of Patent: Jan. 19, 2016

(54) DATA CENTERS TASK MAPPING

(75) Inventors: Andrew Wolfe, Los Gatos, CA (US); Thomas Martin Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 1741 days.

(21) Appl. No.: 12/392,928

(22) Filed: Feb. 25, 2009

(65) Prior Publication Data
US 2010/0218186 A1 Aug. 26, 2010

(51) Int. Cl.
*G06F 15/173* (2006.01)
*G06Q 10/04* (2012.01)
*G06F 9/48* (2006.01)

(52) U.S. Cl.
CPC .............. *G06Q 10/04* (2013.01); *G06F 9/4856* (2013.01); *Y02B 60/144* (2013.01); *Y02B 60/162* (2013.01)

(58) Field of Classification Search
USPC ......................................... 709/201, 223–226
See application file for complete search history.

(56) References Cited

U.S. PATENT DOCUMENTS

| | | | |
|---|---|---|---|
| 6,681,156 B1 | 1/2004 | Weiss | |
| 7,242,920 B2 | 7/2007 | Morris | |
| 2004/0172260 A1* | 9/2004 | Junger et al. | 705/1 |
| 2006/0195607 A1* | 8/2006 | Naseh et al. | 709/238 |
| 2007/0162584 A1* | 7/2007 | Kokusho et al. | 709/223 |
| 2007/0168336 A1* | 7/2007 | Ransil et al. | 707/3 |
| 2007/0217410 A1* | 9/2007 | Kajiyama et al. | 370/389 |
| 2008/0320482 A1 | 12/2008 | Dawson et al. | |
| 2009/0228888 A1 | 9/2009 | Vengerov et al. | |
| 2010/0037031 A1* | 2/2010 | DeSantis et al. | 711/162 |
| 2010/0198423 A1 | 8/2010 | Hirst | |
| 2010/0211810 A1* | 8/2010 | Zacho | 713/324 |
| 2010/0235654 A1* | 9/2010 | Malik et al. | 713/300 |
| 2010/0269111 A1 | 10/2010 | Conte et al. | |
| 2011/0004564 A1* | 1/2011 | Rolia et al. | 705/348 |
| 2011/0010518 A1* | 1/2011 | Kavuri et al. | 711/165 |

* cited by examiner

*Primary Examiner* — Jason Recek
(74) *Attorney, Agent, or Firm* — Dorsey & Whitney LLP (57) ABSTRACT

A data center management system may include a processor coupled to a network. The network may be further coupled to a primary data center and a secondary data center located at a physical location remote from the primary data center. The processor may be adapted to execute computer implemented instructions to determine a first transition point for the primary data center with respect to a secondary data center on the basis of one or more financial indicators, transfer one or more data center tasks from the primary data center to the secondary data center at substantially the first transition point, and execute the one or more transferred data center tasks at the secondary data center.

18 Claims, 11 Drawing Sheets

DATA CENTERS TASK MAPPING

BACKGROUND

Data centers are a collection of secure, fault-resistant resources that are accessed by users over a communications network (e.g., a wide area network (WAN) such as the Internet). By way of example only, the resources of a data center may comprise servers, storage, switches, routers, and/or modems. Data centers may, for example, provide support for corporate websites and services, web hosting companies, telephony service providers, internet service providers, or application service providers.

Data centers carry out tasks that must be executed on a continuous basis as well as tasks that may be queued and executed periodically. Tasks amenable to periodic execution, such as batch processing tasks, include for example, backups, indexing, media encoding, data mining, and the like.

Considerable operating costs, such as electricity/power costs are associated with running data centers. Accordingly, a data center management system that minimizes power costs is desirable.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In some examples, the present disclosure may relate to systems and methods for managing the execution of data center tasks. More particularly, in an illustrative example, the present disclosure may relate to systems and methods for controlling execution parameters for data center tasks such as, for example, where and when the execution of tasks may be carried out. Such systems and methods may, for example, allow for reduction or minimization of operating costs associated with running data centers. Although the present disclosure is described primarily with respect to batch processing tasks, it is to be appreciated that the systems and methods of the present disclosure may be employed with respect to single tasks, multiple tasks, or other task combinations.

Figure 1:
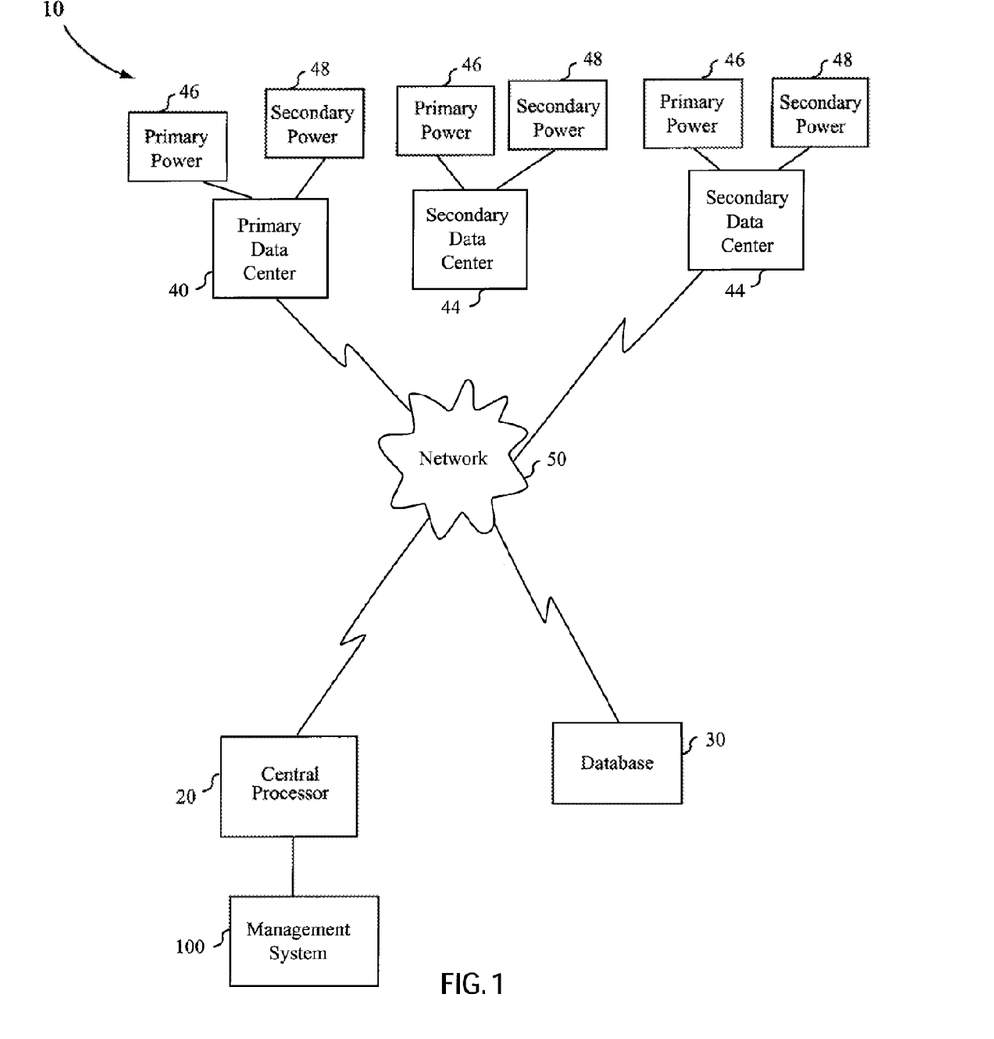
FIG. 1 depicts a pictorial representation of a system environment in which systems and methods of the present disclosure may be implemented.

FIG. 1 depicts a pictorial representation of a system environment 10 in which systems and methods of the present disclosure may be implemented. In some examples, the system environment 10 may comprise a central processor 20, one or more databases 30, a primary data center 40, one or more secondary data centers 44, each equipped with means to communicate with the central processor 20 and database 30 over a network 50 such as the Internet, local area network (LAN), wide area network (WAN), or the like, and a task management system 100.

In various examples, central processor 20 can be any computer or processor known to those skilled in the art, including standard attachments and components thereof (e.g., a disk drive, hard drive, CD player or network server that communicates with a central processing unit (CPU) and main memory, a sound board, a keyboard, a mouse, a monitor, and/or other component). The central processor 20 may comprise software programs and/or machine readable instructions for sending information to and receiving information from the database 30 and/or data centers 40, 44 and/or performing compilation and storage functions. As will be discussed in greater detail below, in one embodiment, the central processor 20 may comprise a set of instructions for controlling the execution of batch processing tasks in one or more of the data centers 40, 44. While the system environment 10 is described with respect to an example wherein the central processor 20 is at a location remote from the data centers 40, 44, it is to be appreciated that the central processor 20 may, alternatively, be provided at the same location of one or more of the data centers 40, 44, and/or be a component of one of the data centers 40, 44.

Figure 2:
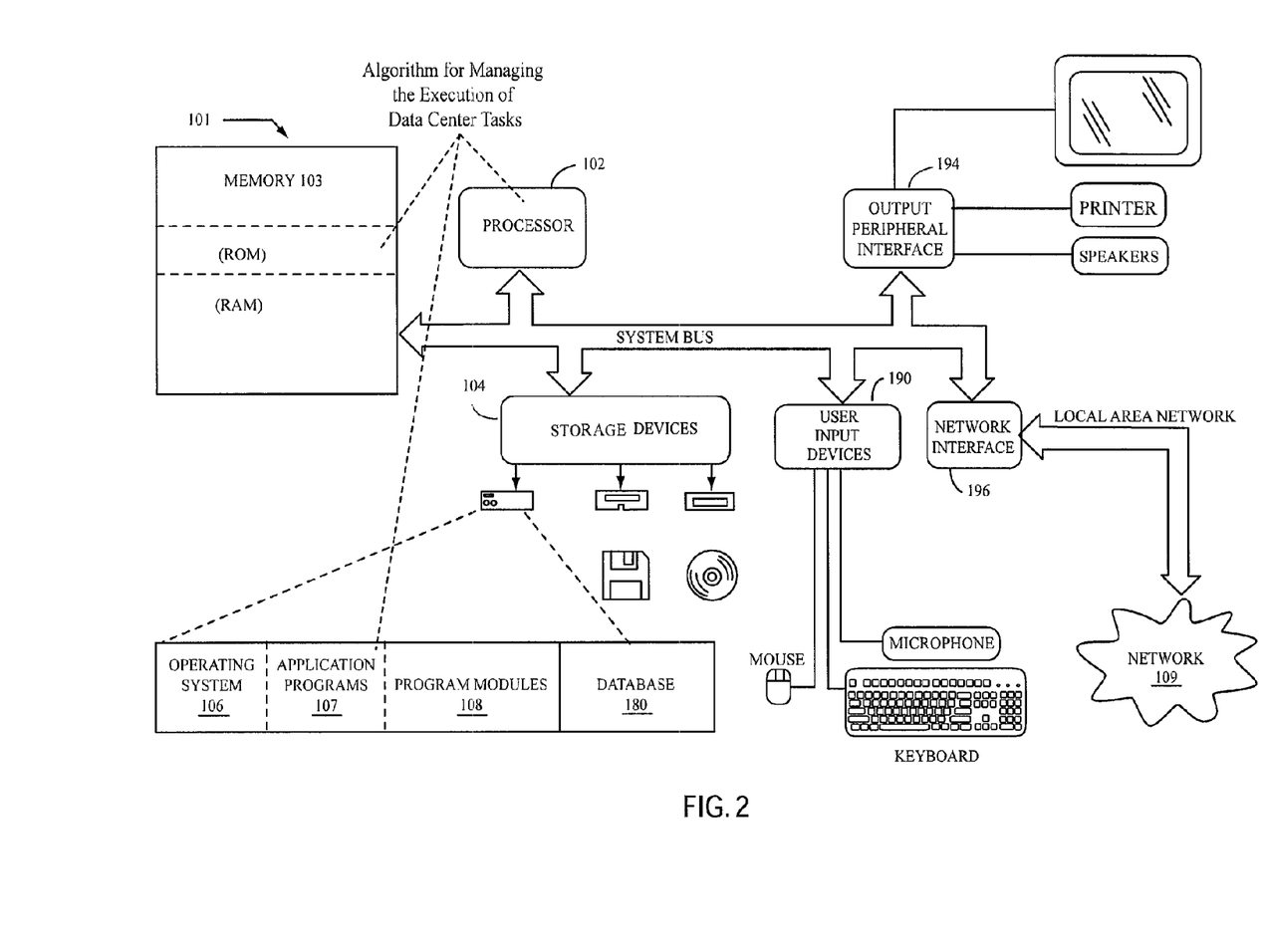
FIG. 2 depicts a computing system for implementing examples of the present disclosure.

With reference to FIG. 2, depicted is a computing system for implementing examples of the present disclosure. For example in one example, central processor 20 may comprise the computing system depicted in FIG. 2. The computing system of FIG. 2 includes a computer 101, including a central processing unit (CPU), also referred to as a processor, 102, main memory 103 and one or more bulk storage devices 104. The processor 102 can generally be of any desired configuration including but not limited to a microprocessor (µP), a microcontroller (µC), a digital signal processor (DSP), or any combination thereof. Thus, each processor 102 can include logic for executing program instructions as well as other functional blocks such as an arithmetic logic unit (ALU), a floating point unit (FPU), a digital signal processing (DSP) core, registers, accumulators, etc. The main memory 103, which may be any suitable form of memory including, but not limited to, volatile memory such as random access memory (RAM), non-volatile memory such as read only memory (ROM) and flash memory storage, data storage devices such as magnetic disk storage (e.g., hard disk drive or HDD), tape storage, optical storage (e.g., compact disk or CD, digital versatile disk or DVD), or other machine-readable storage mediums that can be removable, non-removable, volatile or non-volatile. An algorithm for managing the execution of data center tasks may be provided in the memory 103 such as, for example, in the ROM.

The bulk storage devices 104 and their associated computer storage media provide storage of computer readable instructions, data structures, program modules and other data for the computer 101. The bulk storage devices 104 can also include an operating system 106, application programs 107, program modules 108, and a database 180. The computer 101 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 102 through a user input interface that is coupled to a system bus, but may be coupled by other interface and bus structures, such as a parallel port, game port or a universal serial bus (USB). Computers such as computer 101 may also include other peripheral output devices such as speakers, which may be coupled through an output peripheral interface 194 or the like.

The computer 101 may operate in a networked environment using logical connections to one or more computers, such as a remote computer coupled to network interface 196. The remote computer may be a personal computer, a server, a router, a network PC, a peer device or other common network node, and can include many or all of the elements described above relative to computer 101. The remote computer may be considered the other of the client or the server depending on the designation of the computer 101. Networking environments are commonplace in offices, enterprise-wide area networks (WAN), local area networks (LAN), intranets and the Internet. Source and destination machines need not be coupled by a network 109 or any other means, but instead, data may be migrated via any media capable of being written by the source platform and read by the destination platform or platforms. When used in a LAN or WLAN networking environment, the computer 101 is coupled to the LAN through a network interface 196 or an adapter. When used in a WAN networking environment, computer 101 typically includes a modem or other means for establishing communications over the WAN, such as the Internet or network 109. It will be appreciated that other means of establishing a communications link between the computers may be used.

Referring again to FIG. 1, the system environment 10 may also include one or more databases 30 for storing system data. The databases 30 may be of any type generally known in the art. In one example, the databases 30 may be integral to the central processor 20. In an alternative embodiment, the databases 30 may be accessible to the central processor through a computer network or other suitable communication link. In one embodiment, the database 30 is comprised of a plurality of database servers, some or all of which may be integral to the central processor 20, or some or all of which may be located remotely from the central processor 20.

In illustrative examples, the data centers 40, 44 may comprise any or all of servers, storage, switches, routers, modems, and the like. Alternatively, data centers 40, 44 may comprise any suitable components for data centers known or later developed by those skilled in the art. In some examples, the primary data center 40 may comprise a home data center. That is, the primary data center 40 may be the data center where batch processing tasks are typically carried out and system data associated therewith is typically stored. Accordingly, in some examples, the secondary data centers 44 may comprise data centers to which batch processing tasks and system data associated therewith can be transferred for execution. Alternatively, primary and secondary may be arbitrary designations, thus indicating only that two or more data centers are employed. The data centers 40, 44 may be provided at different locations, at the same location, or a mix thereof. For example, data centers 40, 44 may be provided at locations throughout the world, such as in one or more different continents, hemispheres, time zones, etc. As will be discussed in greater detail below, such positioning of the data centers may accommodate minimization of overall data center operating costs. While the primary data center 40 is described with respect to examples wherein the primary data center 40 comprises a single data center, it is to be understood that any number of data centers may be combined to comprise the primary data center 40.

In various examples, each of the data centers 40, 44 may be operatively coupled to a primary power source 46 such as, for example, wall power received from a power company, and one or more secondary power sources 48 such as a backup battery, diesel generator, solar array, and the like. Generally, power required to operate the data centers 40, 44 may be provided by either or both of the primary power source 46 and the secondary power sources 48.

In illustrative examples, data centers 40,44 may be equipped with capabilities for determining or retrieving one or more current financial indicators. Financial indicators, generally, may refer to any factors which may influence the operating costs associated with the data centers 40, 44. Current financial indicators may refer to financial indicators measured in real-time/instantaneously, periodically, or estimated based on historical data/predictive models which are representative of the current financial indicators. Current financial indicators may include, for example, the current power costs being charged by one or more power providers of a facility housing the data centers 40, 44. As a further example, current financial indicators may include environmental factors associated with a facility housing the data centers 40, 44. For example, environmental factors may include outside temperature, inside temperature, relative humidity, and the like. It is to be appreciated that such environmental factors may have a substantial influence on the costs associated with operating the data centers 40, 44, such as by, for example, influencing the cost of maintaining adequate conditions for running a data center within a facility. For example, it may be required that the data centers be kept above/below predetermined temperatures, humidity, etc. As yet another example, current financial indicators may include total energy cost and/or a subset of total energy cost for a given batch processing task which may, for example, be based on any or all of the cost of power, an estimated amount of computing energy required to carry out the batch processing task, and an estimated amount of additional cooling energy that will be required in the data center as a result of the batch processing task (which may be based on one or more environmental factors). In an additional example, current financial indicators may include costs associated with transferring a batch processing task and the data associated therewith from one data center to another.

In some examples, a task management system 100, such as a batch processing task management system, may be implemented in any computing and/or processing environments, including but not limited to computer software, firmware, device driver, digital electronic circuitry or computer hardware, or any combination of these. In one example, the batch processing task management system 100 may comprise a set of instructions running on processor 20. Batch processing task management system 100 is used to illustrate a generic task management system. It is to be appreciated than any of the task management systems hereinafter described may be used for batch processing task management system 100.

In some examples, the management system 100 may determine a set of execution parameters for one or more batch processing tasks. Execution parameters, generally, may refer to the conditions under which a batch processing task is carried out. For example, execution parameters may include any or all of the time of day of execution, the data center to carry out the execution, and the power source used by the selected data center during execution. In some examples, the execution parameters may be determined or selected based on one or more financial indicators. Accordingly, such selection may be driven to reduce or minimize operating costs associated with running data centers.

Alternatively, or in conjunction with the current financial indicators, in various examples, the management system 100 may control execution of batch processing tasks on the basis of one or more task indicators. Generally, task indicators may refer to any information relating to a particular batch processing task which may bear on execution of that task. For example, task indicators may include the criticality of the task, the estimated computation time of the task, the amount of data associated with the task, security considerations, and the like. Task indicators may be associated with one or more batch processing tasks and stored to the database 30.

In some examples, the management system 100 may continuously or periodically monitor one or more current financial indicators. In one example, the management system may save all such information to the database 30 such that the system accumulates historical data for one or more of the financial indicators. Alternatively, historical data for one or more of the financial indicators may be provided by an external source and stored to the database 30. In further examples, one or more predetermined thresholds representing the maximum tolerable levels of one or more financial indicators may be generated and stored to the database 30. In still further examples, predictive models of future financial indicator levels may be stored to the database 30. The predictive models may be generated on the basis of stored historical data or may be provided from an external source and stored to the database 30. For example, predictive models may include predictions of one or more current financial indicators provided by an online data service such as, for example, environmental factors (e.g., outside temperature and/or humidity) for one or more data centers 40, 44 over a future time interval provide by an online weather service. As a further example, predictive models may include predictions of electricity costs for one or more data centers 40, 44 over a future time interval. Historical data for one or more of the financial indicators, predetermined thresholds representing the maximum tolerable levels of one or more financial indicators, and predictive models of future financial indicator levels, collectively, will hereinafter be referred to as reference financial indicators. As will be discussed below, current financial indicators may be compared to, for example, one or more reference financial indicators in determining the execution parameters for batch processing task. Externally provided financial indicators, whether real-time/instantaneous or predictive, may be used contemporaneously rather than being stored to the database.

Figure 3:
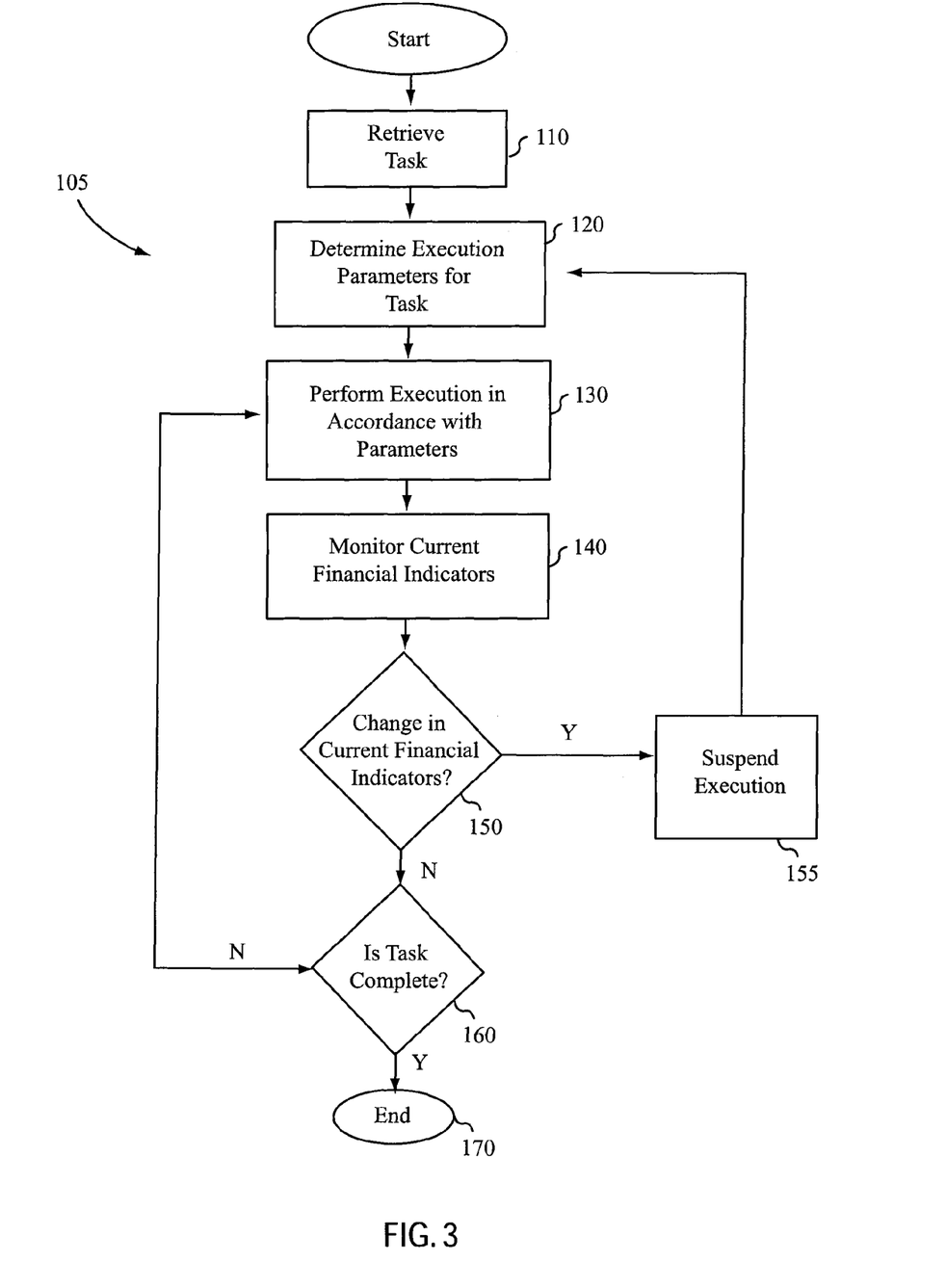
FIG. 3 depicts a process flow diagram of a batch processing task management system in accordance with some examples.

FIG. 3 depicts a process flow diagram of a batch processing task management system 105 in accordance with some examples. The management system 105 may be implemented, for example, in the system environment 10 described above with respect to FIG. 1. In various examples, the central processor 20 may retrieve a batch processing task (block 110). Once a batch processing task is retrieved, the management system 105 may determine the execution parameters for the retrieved batch processing task (block 120). As will be discussed in further detail with reference to FIGS. 4, 5, and 7, on the basis of one or more financial indicators and/or one or more task indicators, determination of the execution parameters (block 120) may include identifying the time of day for execution, the data center to carry out the execution, and/or the power source to be used by the data center during execution.

After the execution parameters for a batch processing task are determined (block 120), the primary data center 40 may perform execution of the batch processing task in accordance with the determined execution parameters (block 130). Upon commencement of execution, in some embodiments, the management system 105 may monitor one or more financial indicators, for example, continuously or periodically (block 140). Next, a determination may be made as to whether one or more current financial indicators have exceeded a predetermined threshold (block 150). For example, it may be determined whether the cost of electricity and/or one or more environmental factors (e.g., outside temperature, inside temperature, humidity) has risen above a predetermined threshold. If it is determined that a predetermined threshold has been exceeded, execution may be suspended (block 155), and the process may return to block 120 to reevaluate the execution parameters for the selected task. Otherwise, the management system 105 may query whether execution of the batch processing task is complete (block 160). If it is determined that execution of the task is complete, the management system 105 terminates the process (block 170). Otherwise, the process returns to block 130 to continue execution of the batch processing task.

Alternatively, in some examples, on the basis of one or more task indicators, after commencing performance of execution of a batch processing task (block 130), the management system may continue execution of the batch processing task irrespective of the fluctuation in current financial indicators (i.e., the process may bypass block 150). For example, if the batch processing task is a backup which has not been carried out for an extended period, the system may complete execution of the backup irrespective of any fluctuation in current financial indicators because the task is too critical to suspend. Accordingly, in some examples, tasks may be flagged with relative importance and determination of the execution parameters for a task may take into account such flags.

Figure 4:
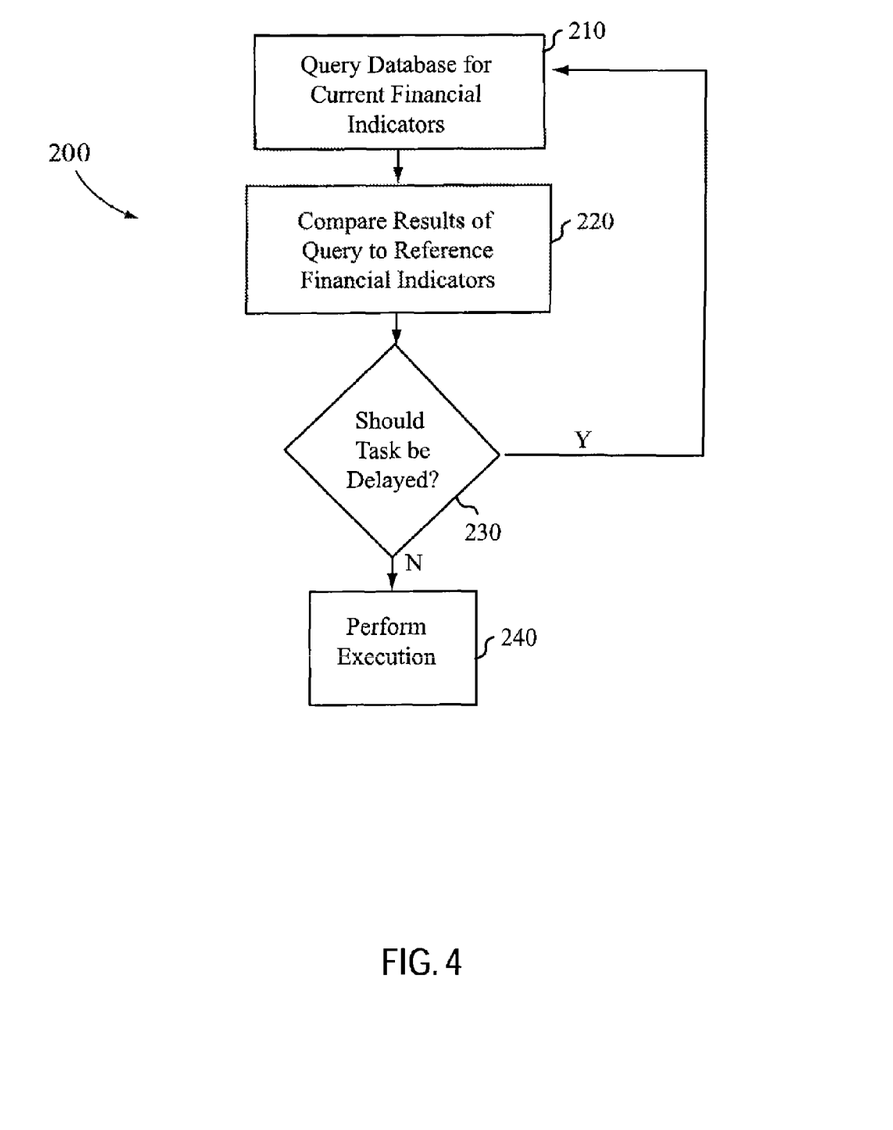
FIG. 4 depicts a process flow diagram of a batch processing task management system in accordance with some examples.

FIG. 4 depicts a process flow diagram of a batch processing task management system 200 in accordance with some examples. The management system 200 may be implemented, for example, in the system environment 10 described above with respect to FIG. 1. Generally, the management system 200 may be employed to determine when to perform execution of a batch processing task such that operating costs associated with data centers may be minimized. In some embodiments, the management system 200 may query the database for one or more current financial indicators (block 210). Next, the management system 200 may compare the results of the query to one or more reference financial indicators (block 220). For example, the results of the query may be compared to historical data for the financial indicators, predetermined thresholds representing the maximum tolerable value for one or more financial indicators, predictive models of future financial indicator levels, and/or combinations thereof.

On the basis of the comparison of the current financial indicators to the reference financial indicators, the management system 200 may determine whether execution of a batch processing task should be delayed (block 230). In some examples, the batch processing task may be delayed for either a definite period or an indefinite period. For example, a predetermined threshold may indicate that $0.80 per kWh is the maximum tolerable cost of electricity. Accordingly, the management system may delay the batch processing task to be executed until the current cost of electricity is $0.80 per kWh or less (i.e., an indefinite period). Alternatively, or in conjunction with the predetermined threshold, for example, if according to a predictive model, at 1:00 pm the cost of electricity may be higher than the cost of electricity at 1:00 am, the management system 200 may determine that the batch processing tasks should be delayed until 1:00 am (i.e., a definite period).

If it is determined that the execution of a batch processing task should be delayed, the process may return to the block 210 for reevaluation of the current financial indicators. Otherwise, execution of the batch processing task may be performed (block 240).

As a further example, a batch processing may need to be completed within a predetermined time interval such as, for example, within 24 hours. The task may have a predetermined computation time associated therewith such as, for example, 18 hours. The total energy cost may be calculated for periods within the predetermined time interval such as, for example, 1-hour periods. The 18 lowest-cost periods may be selected to execute the task. In one example, the data center may be turned off or remain idle during the periods not selected for execution.

Figure 5:
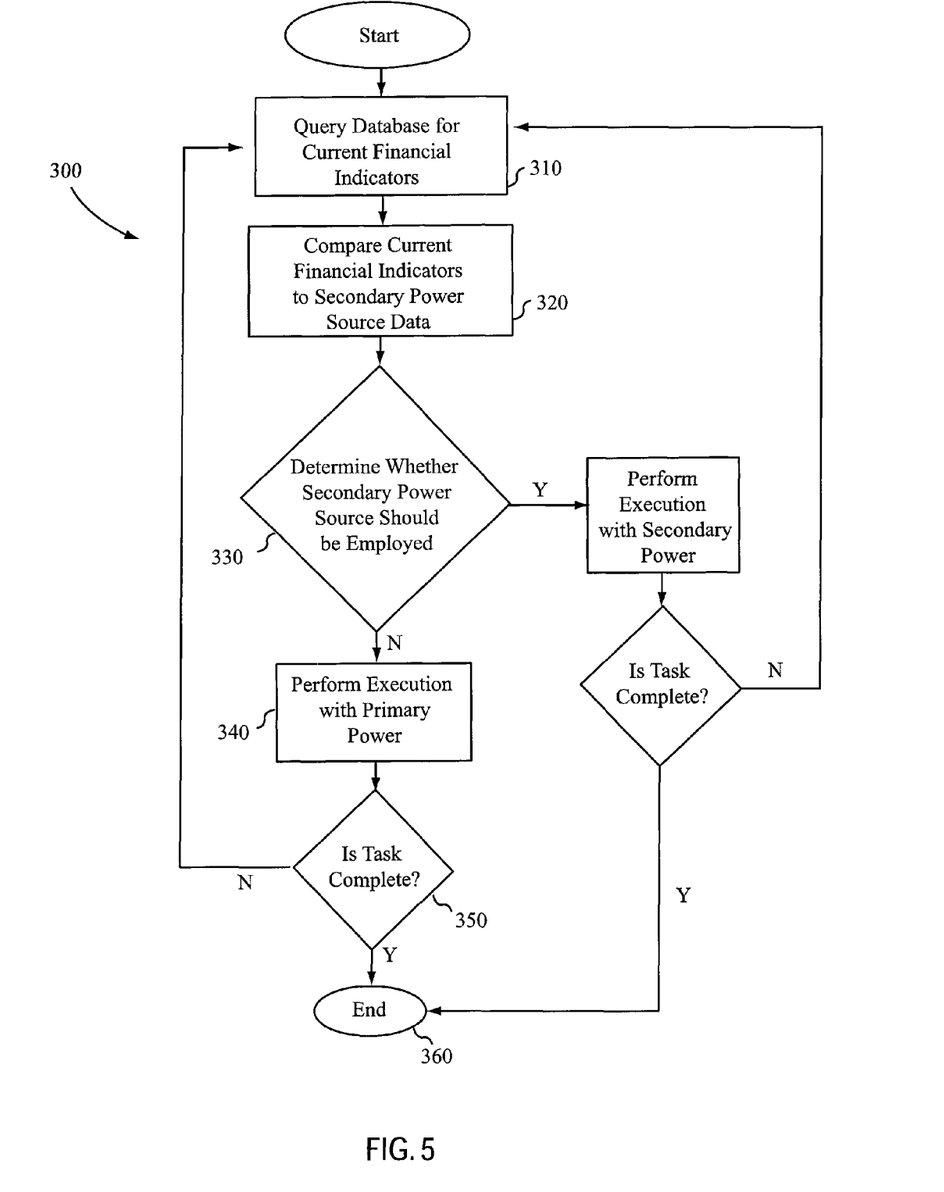
FIG. 5 depicts a process flow diagram of a batch processing task management system in accordance with some examples.

FIG. 5 depicts a process flow diagram of a management system 300 in accordance with illustrative example. The management system 300 may be implemented, for example, in the system environment 10 described above with respect to FIG. 1. Generally, the management system 300 may be employed to determine whether a primary or secondary power source should be used to perform execution of a batch processing task.

In some examples, the management system 300 may query the database for one or more current financial indicators (block 310). Next, the management system 300 may compare the results of the query to one or more reference financial indicators relating to the secondary power source and/or predetermined thresholds representing maximum tolerable levels for one or more current financial indicators (block 320). For example, the results of the query may be compared to historical data for the cost of operating a secondary power source, predetermined thresholds for one or more current financial indicators, and/or combinations thereof.

On the basis of the comparison of the current financial indicators to the reference financial indicators relating to the secondary power source and/or predetermined thresholds, the management system 300 may determine whether execution of a batch processing task should be performed using a secondary power source (block 330). For example, a predetermined threshold may indicate that $0.80 per kWh is the maximum tolerable cost of electricity from a primary power source. Accordingly, the management system may perform the batch processing task using a secondary power source if the current cost of electricity is $0.80 per kWh or more. In further examples, election of a secondary power source may consider one or more limitations on the secondary power source such as, for example, that the secondary power source has a limited power supply (e.g., a battery that can only be used for 1 hour at a time) and/or that the secondary power source may only be used during certain times of a day (e.g., solar power that is only available until 16:00 H).

If it is determined that the execution of a batch processing task should not be performed using a secondary energy source, the management system 300 may perform the batch processing task using the primary energy source (block 340). Alternatively, the batch processing task may be delayed for a definite or indefinite period. Some time after commencing performance of the batch processing task using the primary energy source (block 340), the management system 300 may query whether execution of the batch processing task is complete (block 350). If it is determined that execution of the task is complete, the management system 300 may terminate the process (block 360). Otherwise, the process may return to block 310 to reevaluate the current financial indicators.

If it is determined that the execution of a batch processing task should be performed using a secondary energy source, the management system 300 may perform the batch processing task using the secondary energy source (block 370). Some time after commencing performance of the batch processing task using the secondary energy source (block 370), the management system 300 may query whether execution of the batch processing task is complete (block 380). If it is determined that execution of the task is complete, the management system 300 may terminate the process (block 390). Otherwise, the process may return to block 310 to reevaluate the current financial indicators.

In some examples, as previously discussed, the primary data center 40 may be housed in a facility located in a different region of the world from one or more secondary data centers 44. For example, a primary data center 40 may be housed in a facility in a first region (R1), such as for example, California, and a secondary data center 44 may be housed in a facility in a second region (R2), such as for example, South Africa. However, any number of additional data centers may be housed in facilities in any number of additional regions of the world such as, for example, different continents, hemispheres, time-zones, and the like.

In one example, a secondary power source such as, for example, a battery, may be available to provide 1 hour of power. A batch processing task may be predicted to require a predetermined amount of time to complete such as, for example, 18 hours. The total energy cost may be approximated for predetermined intervals, such as 5 minute intervals, using the primary power source. During the 12 periods of highest energy cost, battery power may be employed in lieu of the primary power source.

Figure 6:
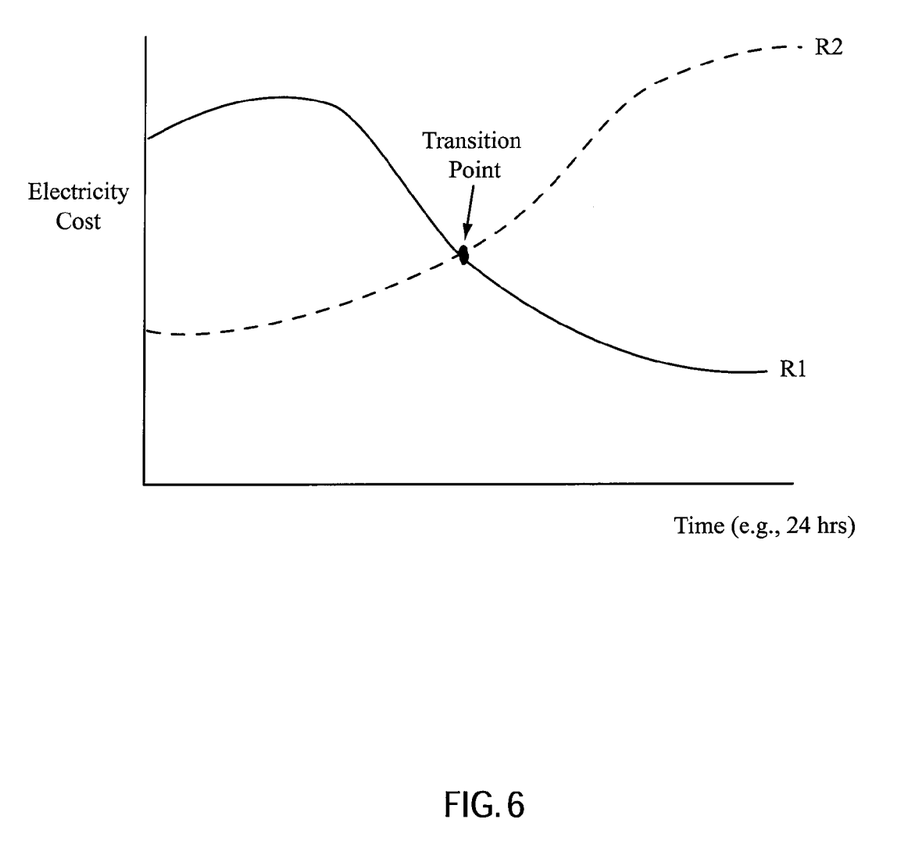
FIG. 6 depicts a plot of total energy cost versus time of day for a primary data center housed in the first region and a secondary data center housed in a second region in accordance with illustrative examples.

FIG. 6 depicts a plot (hereinafter "cost curve") of a current financial indicator, total energy cost, for example, versus time of day for a primary data center 40 housed in the first region R1 (solid line curve) and a secondary data center 44 housed in the second region R2 (dotted line curve), in accordance with illustrative examples. As shown, the cost curves may be plotted over a 24 period. Alternatively, the cost curves may be plotted over any selected period. For purposes of illustration only, at any given time during the 24 hour period, the total energy costs may be less expensive in first region R1 as compared to second region R2. Therefore, in some examples, when the total energy costs in the second region R2 drop below the total energy costs in the first region R1 (the "transition point"), the batch processing task and the data associated therewith (i.e., the data upon which the batch processing task needs to operate) may be moved from the first region R1 to the second region R2 to be carried out in the second region R2. It follows that as the as the cost in the second region R2 rises, the batch processing task and data associated therewith may be relocated back to the first region R1. Generally, batch processing tasks and data associated therewith may move around to different regions of the world, such that the overall operating costs for executing the batch processing tasks may be minimized.

In further examples, the energy cost curve for a given data center may include the energy cost of the energy for performing a batch processing task, the additional energy cost for cooling the datacenter due to the task, or both. In one example, the transition point can be set to a point where the total energy cost at region R1 is more than the energy cost at region R2. In another example, the transition point can be set to the point where the predicted total energy cost at region R1 (integrated) over a future time interval is more than the predicted total energy cost at region R2 over the future time interval. In yet another example, the task can be transitioned from R1 to R2 when the predicted total energy cost to complete the task at R2 (another integral under the curve) is less than the predicted total energy cost to complete the task at R1.

Figure 7:
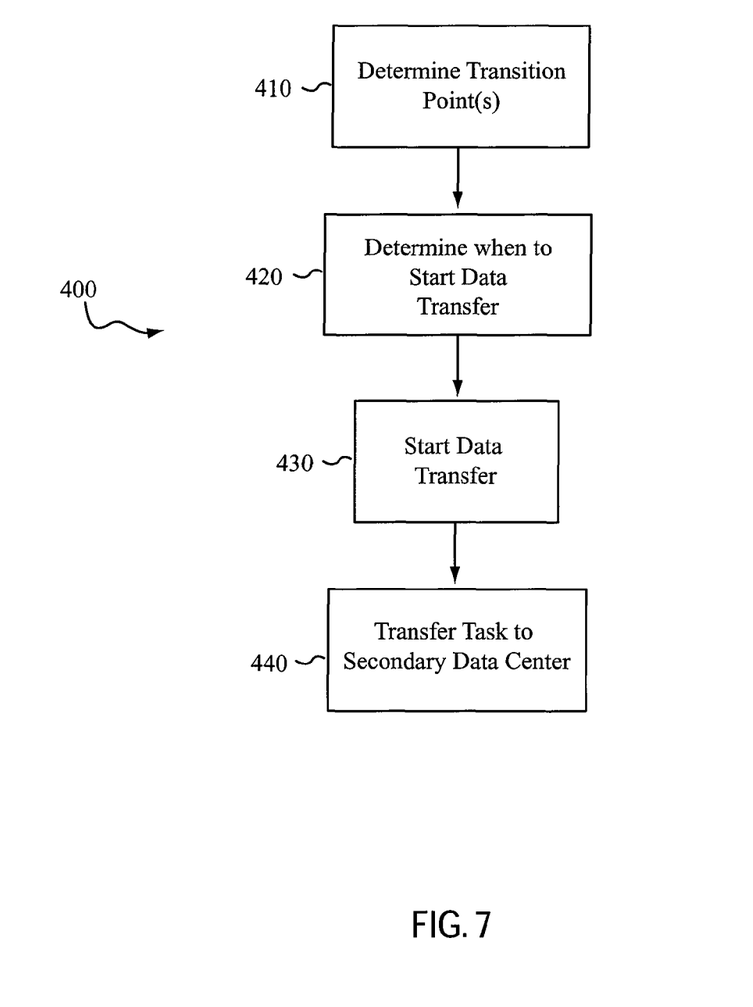
FIG. 7 depicts a process flow diagram of a management system in accordance with some examples.

FIG. 7 depicts a process flow diagram of a management system 400 in accordance with illustrative examples. In various embodiments, the management system 400 may be performed on the basis of any suitable time period such as, for example, a 24 hour time period. Generally, the management system 400 may be employed to determine whether a primary data center 40 or one or more secondary data centers 44 may be used to perform execution of a batch processing task, such that the overall operating costs associated with the data centers are reduced or minimized. The management system 400 may be implemented, for example, in the system environment 10 described above with respect to FIG. 1.

In some examples, the management system 400 may determine one or more execution parameters such as, for example, the transition point(s) for a primary data center 40 with respect to one or more secondary data centers 44 (block 410). As with previous examples, with respect to any or all of the data centers 40, 44, the management system 400 may have access to current financial indicators and/or reference financial indicators such as, for example, historical data relating to financial indicators, and/or predictive models of financial indicators. Accordingly, in one example, the transition points may be determined on the basis of current financial indicators and/or reference financial indicators. In other examples, the transition points may be determined on the basis of the computation time for the batch processing task and/or the amount of data associated therewith that needs to be moved. In still other examples, the transition points may be determined on the basis the variation in performance and/or reliability of the networks on which data is to be communicated. Accordingly, in one example, the management system 400 may be configured to determine variation in performance and/or reliability of the networks such as, for example, a level of variation in performance and/or reliability.

In some examples, large amounts of data may be associated with one or more of the batch processing tasks. Depending on, for example, the speed and/or reliability of the network, the time it takes to transfer data from one data center to another may be appreciable. Therefore, once the transition points are determined, in one embodiment, the management system may determine when to begin transferring data associated with the batch processing tasks that are being transferred (block 420). Determination of when to begin transferring data may be carried out on the basis of the amount of data to be transferred, the speed of the network, the reliability of the network, etc. For example, if a substantial amount of data is to be transferred, the transfer may need to begin well before the transition point. It is to be appreciated that the data associated with the batch processing tasks which is transferred may be a copy of the associated data or the original data.

Next, data may begin transferring at the time identified in the step of block 420 (block 430). Alternatively, data associated with the transferred batch processing tasks may be transferred concomitantly with the transfer of the batch processing tasks (i.e., blocks 420 and 430 may be skipped). Finally, the management system 400 may transfer the batch processing task to another data center for execution (block 440). The batch processing task may be transferred at the transition point, or some predetermined time before or after the transition point.

While the management system 400 is described with respect to an example having one secondary data center 44, it is to be appreciated that the management system 400 may be carried out with any number of additional secondary data centers 44 located in different regions of the world such as, for example, different continents, hemispheres, time-zones, and the like.

Figure 8:
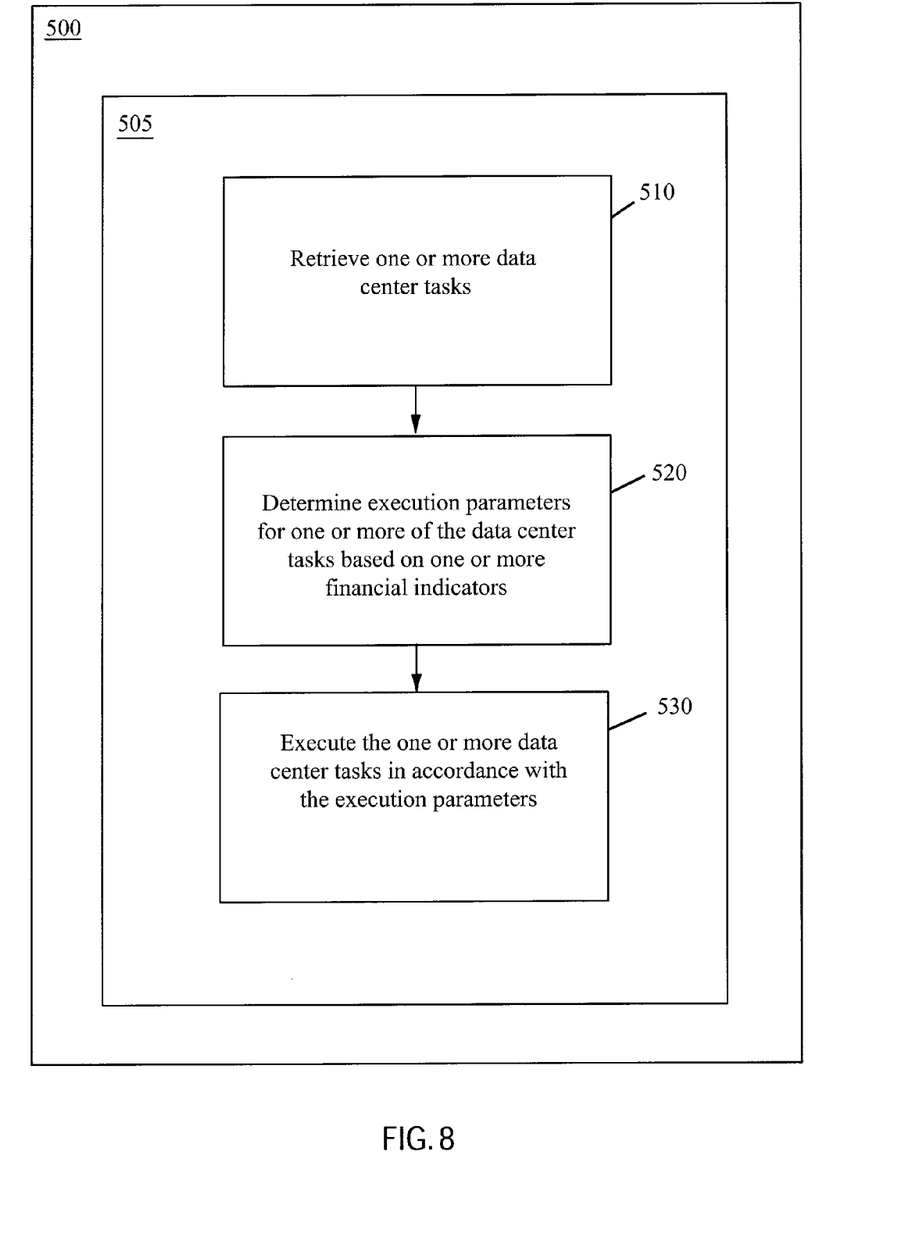
FIG. 8 depicts a schematic of a system for performing a method of managing data center tasks in accordance with one example.

In one particular example, as shown in the schematic of FIG. 8, a computer system 500 may include a processor 505 configured for performing an embodiment of a method for managing data center tasks. In other examples, various operations or portions of various operations of the method may be performed outside of the processor 505. In various examples, the method may include retrieving one or more data center tasks (block 510). The method may then include determining execution parameters for the one or more of the data center tasks based on one or more financial indicators (block 520). Finally, the method may include executing the one or more data center tasks in accordance with the execution parameters (block 530).

Figure 9:
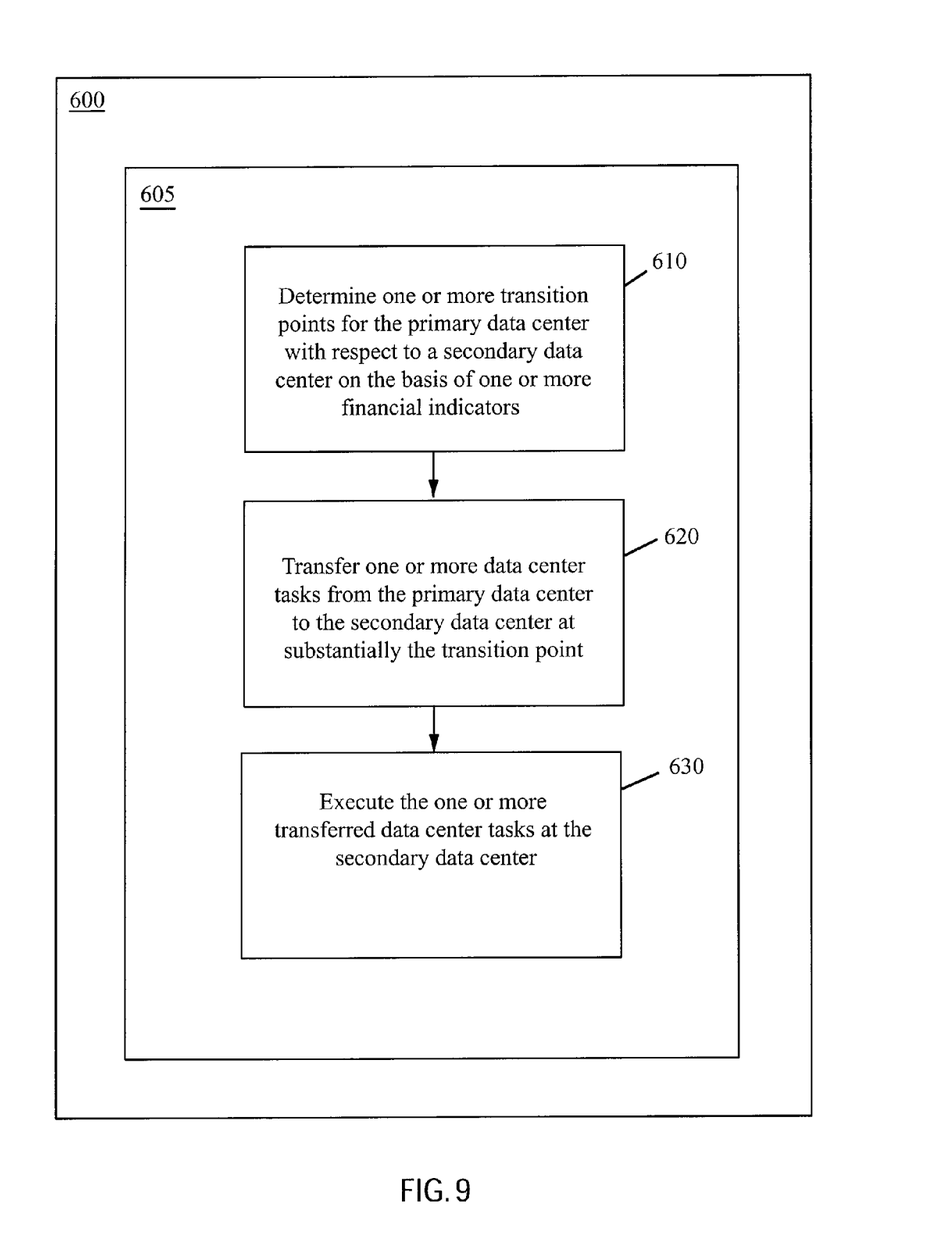
FIG. 9 depicts a schematic of a system for performing a method of managing data center tasks in accordance with one example.

In another particular example, as shown in the schematic of FIG. 9, a computer system 600 may include a processor 605 configured for performing an embodiment of a method of managing data center tasks. In other examples, various operations or portions of various operations of the method may be performed outside of the processor 605. In various examples, the method may include determining one or more transition points for the primary data center with respect to a secondary data center on the basis of one or more financial indicators (block 610). The method may then include transferring one or more data center tasks from the primary data center to the secondary data center at substantially the transition point (block 620). Finally, the method may include executing the one or more transferred data center tasks at the secondary data center (block 630).

While the present disclosure is described with respect to examples in which the management systems 105, 200, 300, 400 are implemented separate from one another, it is to be appreciated that any combinations of the management systems 105, 200, 300, 400 may be implemented in conjunction with one another.

Figure 10:
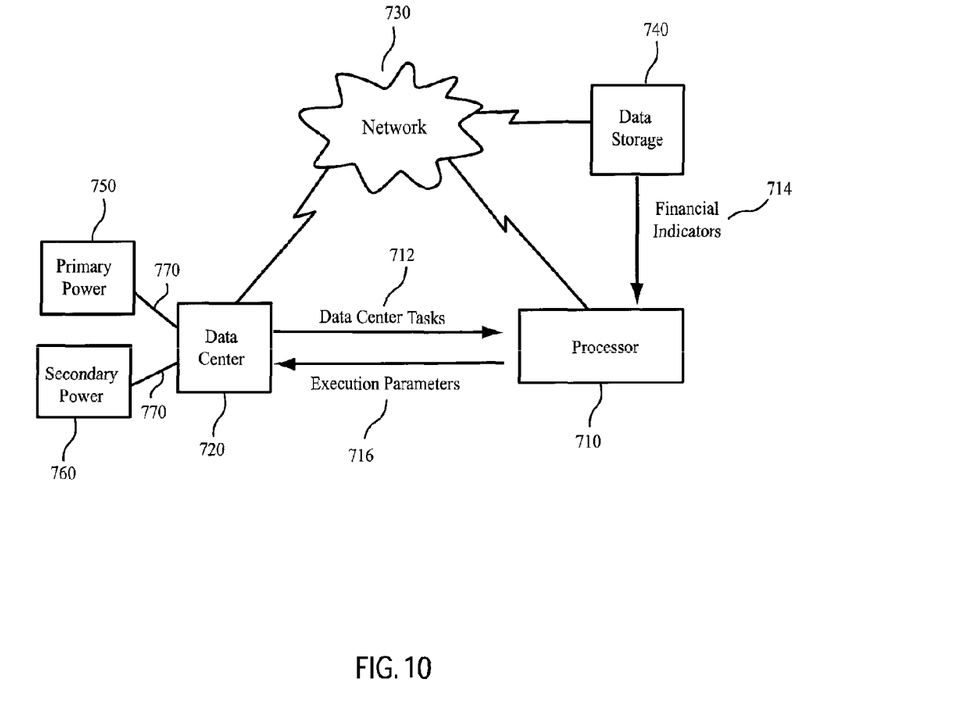
FIG. 10 depicts a schematic diagram of a data center task management system in accordance with one example.

FIG. 10 depicts a schematic diagram of a data center task management system in accordance with one example. As shown, a data center 720 is provided and, in some examples, may have a primary power source 750 and a secondary power source 760, each coupled to the data center 720 through suitable connection lines 770. A processor 710 may retrieve a data center task 712 from the data center 720 over a network 730. The processor may determine the execution parameters for the data center task 712. The execution parameters may be determined based on financial indicators 714 communicated from a data storage 740 to the processor 710 over the network 730. Alternatively, if the data storage 740 is part of the processor 710, the financial indicators may be communicated via a data bus or memory bus. In some examples, the data center 720 may have operations for monitoring the financial indicators and communicating status of the financial indicators to the processor. The execution parameters may be communicated from the processor 710 to the data center 720 over the network 730 such that the data center may execute the task in accordance with the execution parameters 716. Alternatively, the execution parameters may be communicated from the processor 710 to the data storage 740 over the network 730. The execution parameters 716 may be communicated from the data storage 740 to the data center 720 such that the data center may execute the task in accordance with the execution parameters 716. In some examples, one of the execution parameters 716 may be to suspend execution of the one or more data center tasks. In other examples, the execution parameters 716 may include which of the primary power source 750 and the second power source 760 are to be used during the execution of a data center task.

Figure 11:
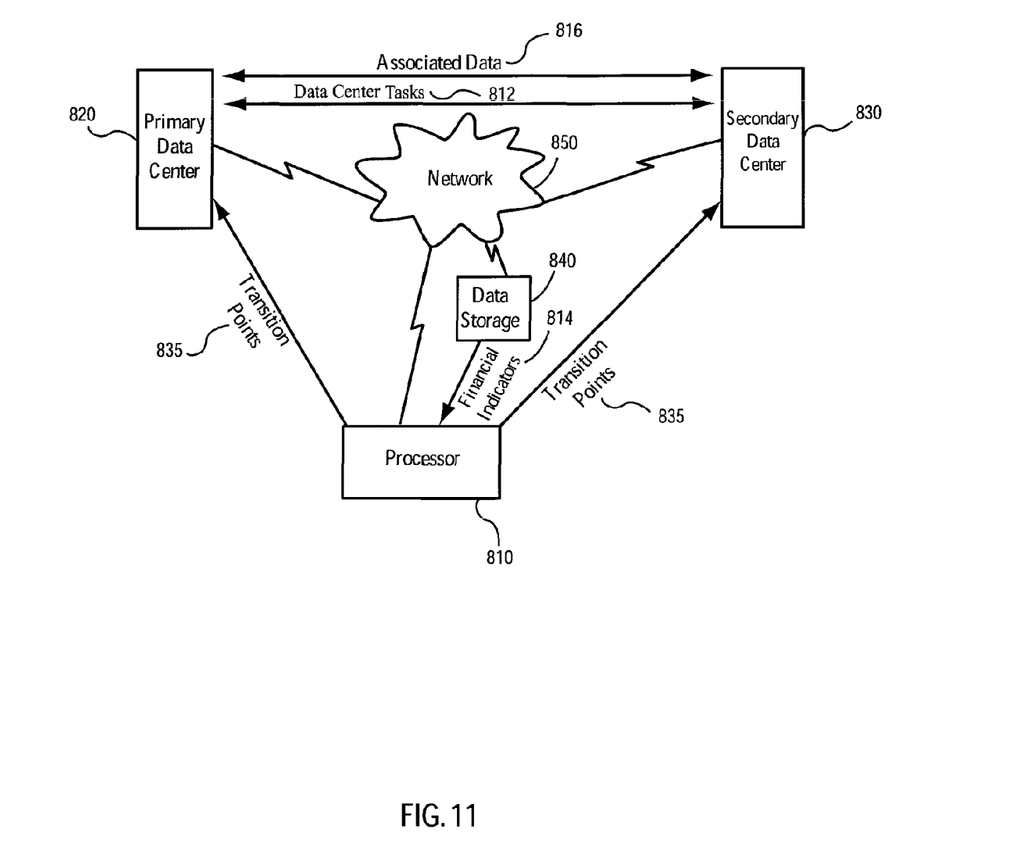
FIG. 11 depicts a schematic diagram of a data center task management system in accordance with one example.

FIG. 11 depicts a schematic diagram of a data center task management system in accordance with one example. As shown, a primary data center 820 and a secondary data center 830 are provided. The data centers 820 and 830 may execute data center tasks 812. In some examples, data 816 may be associated with the data center tasks 812. In some examples, a processor 810 may determine one or more transition points 835 for the primary data center 820 with respect to the secondary data center 830. The transition points 835 may be determined based on financial indicators communicated from a data storage 840 to the processor 810 over a network 850. Alternatively, if the data storage 840 is part of the processor 810, the financial indicators 814 may be communicated via a data bus. At substantially the transition point 835, one or more data center tasks 812 may be transferred from the primary data center 820 to the secondary data center 830 over the network 850. The secondary data center 830 may execute one or more of the transferred tasks. The data 816 associated with the data center tasks 812 may be transferred between data centers 820, 830. In some examples, the processor 810 may also determine when to begin transferring associated data 816 between respective data centers 820, 830.

It is to be appreciated that any or all of the elements described with respect to FIGS. 10 and 11 may or may not relate to the same elements discussed with respect to previous examples.

The foregoing describes various examples of systems and methods of managing data center tasks. Following are specific examples of systems and methods of managing data center tasks. These are for illustration only and are not intended to be limiting.

The present disclosure generally relates to management systems for controlling the execution of tasks in data centers. The described management systems may include a processor connected to a network, wherein the network is further connected to a primary data center and a secondary data center located at a physical location remote from the primary data center, and a memory connected to the processor. The processor may be adapted to execute computer implemented instructions to determine one or more transition points for the primary data center with respect to a secondary data center based on one or more financial indicators, transfer one or more data center tasks from the primary data center to the secondary data center at substantially the transition point, and execute the one or more transferred data center tasks at the secondary data center.

The present disclosure also generally relates to methods for controlling the execution of tasks in a primary data center and a secondary data center located at a physical location remote from the primary data center is provided. The described methods may include determining one or more transition points for the primary data center with respect to a secondary data center based on one or more financial indicators, transferring one or more data center tasks from the primary data center to the secondary data center at substantially the transition point, and executing the one or more transferred data center tasks at the secondary data center.

The present disclosure further generally relates to digital storage media having code provided thereon for programming one or more processors to perform a procedure for minimizing operating costs associated with running one or more data centers. The described procedures may include determining one or more transition points for the primary data center with respect to a secondary data center based on one or more financial indicators, transferring one or more data center tasks from the primary data center to the secondary data center at substantially the transition point, and executing the one or more transferred data center tasks at the secondary data center.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A management system to control execution of batch process tasks in data centers, the management system comprising:
   a processor configured to couple to a network, wherein the network is further coupled to a primary data center and a secondary data center located at a physical location remote from the primary data center;
   wherein the processor is adapted to execute computer implemented instructions to:
      determine a predicted first transition point for the primary data center with respect to the secondary data center based on one or more financial indicators;
      in advance of the first transition point, initiate transfer of data associated with one or more data center batch process tasks from the primary data center to the secondary data center;
      transfer the one or more data center batch process tasks from the primary data center to the secondary data center at substantially the first transition point; and
      execute the one or more transferred data center batch process tasks at the secondary data center.

2. The management system of claim 1, wherein the data center batch process tasks are executed upon data associated therewith, and wherein the processor is further adapted to execute computer implemented instructions to determine when to begin transfer of the data associated with the one or more data center batch process tasks.

3. The management system of claim 2, wherein the processor is further adapted to execute computer implemented instructions to determine when to begin transfer of the data associated with the one or more data center batch process tasks based on an amount of associated data to be transferred.

4. The management system of claim 2, wherein the processor is adapted to execute computer implemented instructions to determine when to begin transfer of the data associated with the one or more data center batch process tasks based on a reliability of the network.

5. The management system of claim 1, wherein the processor is further adapted to:
   execute computer implemented instructions to determine a predicted second transition point for the secondary data center relative to the primary data center based on one or more financial indicators;
   transfer the one or more data center batch process tasks from the secondary data center back to the primary data center at substantially the second transition point; and
   continue to execute the one or more transferred data center tasks at the primary data center.

6. The management system of claim 1, wherein the financial indicator includes the cost of electricity.

7. The management system of claim 1, wherein the one or more data center batch process tasks are configured to execute at the primary data center prior to the first transition point.

8. A method to control execution of batch process tasks in a primary data center and a secondary data center located at a physical location remote from the primary data center, the method comprising:
   determining a predicted first transition point for the primary data center with respect to the secondary data center based on one or more financial indicators;
   in advance of the first transition point, initiating transfer of data associated with one or more data center batch process tasks from the primary data center to the secondary data center;

transferring the one or more data center batch process tasks from the primary data center to the secondary data center at substantially the first transition point; and executing the one or more transferred data center batch process tasks at the secondary data center.

9. The method of claim 8, wherein the data associated with the one or more data center batch process tasks comprises the data upon which the one or more data center batch process tasks operate, and wherein the method further comprises determining when to begin transfer of the data associated with the one or more data center batch process tasks.

10. The method of claim 9, wherein determining when to begin transfer of the data associated with the one or more data center batch process tasks is carried out based on an amount of data to be transferred.

11. The method of claim 9, wherein determining when to begin transfer of the data associated with the one or more data center batch process tasks is carried out based on a reliability of a network.

12. The method of claim 8, further comprising:
    determining a predicted second transition point for the secondary data center relative to the primary data center based on one or more financial indicators;
    transferring the one or more data center batch process tasks from the secondary data center back to the primary data center at substantially the second transition point; and
    continuing to execute the one or more transferred data center batch process tasks at the primary data center.

13. The method of claim 8, wherein the one or more data center batch process tasks are executing at the primary data center prior to said transferring the one or more data center batch process tasks from the primary data center to the secondary data center at substantially the first transition point.

14. A non-transitory digital storage medium having code provided thereon to program one or more processors to perform a procedure to reduce operating costs associated with running one or more data centers, wherein the procedure comprises:

determining a predicted first transition point for a primary data center with respect to a secondary data center based on one or more financial indicators;
    in advance of the first transition point, initiating transfer of data associated with one or more data center batch process tasks from the primary data center to the secondary data center;
    transferring the one or more data center batch process tasks from the primary data center to the secondary data center at substantially the first transition point; and
    executing the one or more transferred data center batch process tasks at the secondary data center.

15. The non-transitory digital storage medium of claim 14, wherein the data associated with the one or more data center batch process tasks comprises the data upon which the data center batch process tasks operate, and wherein the procedure further comprises determining when to begin transfer of the data associated with one or more data center batch process tasks.

16. The non-transitory digital storage medium of claim 14, wherein the procedure further comprises:
    determining a predicted second transition point for the secondary data center relative to the primary data center based on one or more financial indicators;
    transferring the one or more data center batch process tasks from the secondary data center back to the primary data center at substantially the second transition point; and
    continuing to execute the one or more transferred data center tasks at the primary data center.

17. The non-transitory digital storage medium of claim 14, wherein the primary data center is located in a different region of the world from the secondary data center.

18. The non-transitory digital storage medium of claim 14, wherein the one or more data center batch process tasks are executing at the primary data center prior to said transferring the one or more data center batch process tasks from the primary data center to the secondary data center at substantially the first transition point.

\* \* \* \* \*